United States Patent
Saito et al.

(10) Patent No.: US 6,791,803 B2
(45) Date of Patent: Sep. 14, 2004

(54) MAGNETIC RECORDING AND REPRODUCING METHOD AND MAGNETIC RECORDING MEDIUM EMPLOYED FOR THE SAME

(75) Inventors: Shinji Saito, Odawara (JP); Nobuo Yamazaki, Odawara (JP); Hitoshi Noguchi, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/218,569

(22) Filed: Aug. 15, 2002

(65) Prior Publication Data

US 2003/0128453 A1 Jul. 10, 2003

(30) Foreign Application Priority Data

Aug. 20, 2001 (JP) ........................................ 2001-249288

(51) Int. Cl.[7] ................................................ G11B 5/02
(52) U.S. Cl. ......................... 360/313; 360/55; 428/329; 428/694 BH
(58) Field of Search .......................... 428/329, 694 BH; 360/313, 55

(56) References Cited

U.S. PATENT DOCUMENTS 6,034,847 A * 3/2000 Komuro et al. ............. 360/126
6,490,131 B2 * 12/2002 Sano et al. .................. 360/126
6,521,361 B2 * 2/2003 Ejiri et al. ............. 428/694 BN

FOREIGN PATENT DOCUMENTS

JP          02001297423 A  * 10/2001

* cited by examiner

*Primary Examiner*—Stevan A. Resan
(74) *Attorney, Agent, or Firm*—Sughrue Mion, PLLC

(57) ABSTRACT

Provided are a method of magnetic recording and reproducing capable of permitting high density recording on magnetic recording media even under the condition of high data transfer rates and yielding adequate recording and reproduction characteristics when an MR head is used in reproduction, and a magnetic recording medium capable of being used in this magnetic recording and reproducing method. The magnetic recording and reproducing method is a method for reproducing a signal magnetically recorded on a magnetic recording medium with a magnetoresistive (MR) head. The magnetic recording medium comprises a substantially nonmagnetic lower layer and a magnetic layer comprising a hexagonal ferrite ferromagnetic powder and a binder in this order on at least one side of a nonmagnetic support, in which said hexagonal ferrite ferromagnetic powder has a mean plate diameter ranging from 15 to 40 nm and a mean plate thickness ranging from 4 to 15 nm, and said magnetic layer has a coercive force Hc ranging from 143.3 to 318.4 kA/m, and said signal magnetically recorded has a maximum recording frequency ranging from 10 to 80 MHz.

6 Claims, No Drawings

MAGNETIC RECORDING AND REPRODUCING METHOD AND MAGNETIC RECORDING MEDIUM EMPLOYED FOR THE SAME

FIELD OF THE INVENTION

The present invention relates to a magnetic recording and reproducing method in which a signal magnetically recorded on a magnetic recording medium is reproduced with an MR head, and a magnetic recording medium employed for the magnetic recording and reproducing method.

In particular, the present invention relates to a magnetic recording and reproducing method in which a signal magnetically recorded on a magnetic recording medium for high-density recording comprising a substantially nonmagnetic lower layer and a magnetic layer comprising a hexagonal ferrite ferromagnetic powder and a binder in this order is reproduced with an MR head, and a magnetic recording medium employed for the method.

BACKGROUND OF THE INVENTION

In the field of magnetic recording disks, 2 MB MF-2HD floppy disks employing Co-modified iron oxide have been mounted normally in personal computers. However, today, with the rapid increase in the volume of data handled, the capacity of such disks is inadequate and there is a need for the development of high-capacity floppy disks.

In response to the demand for high-capacity floppy disks, a disk-shaped magnetic recording medium comprised of a thin magnetic layer and a functional nonmagnetic layer has recently been proposed, and floppy disks in the 100 MB class have been developed. Examples of disk-shaped magnetic recording media having such characteristics are those described in Japanese Unexamined Patent Publication (KOKAI) Heisei Nos. 5-109061 and 5-290354. That is, Japanese Unexamined Patent Publication (KOKAI) Heisei No. 5-109061 discloses a configuration having a magnetic layer with a coercive force Hc equal to or higher than 111 kA/m (1,400 Oe) and a thickness equal to or less than 0.5 $\mu$m, and a nonmagnetic layer comprising electrically conductive particles. Japanese Unexamined Patent Publication (KOKAI) Heisei No. 5-290354 discloses a configuration having a magnetic layer equal to or less than 0.5 $\mu$m in thickness, with the thickness variation in the magnetic layer being within ±15 percent, and the surface electrical resistivity being prescribed.

In the field of magnetic recording tapes, with the widespread popularity of office computers such as minicomputers, personal computers, and work stations in recent years, a large amount of research has been conducted into magnetic recording tapes (so-called "back-up tapes") used to record computer data as an external memory medium. In the practical implementation of magnetic recording tapes for such applications, particularly as the size of computers has decreased and information processing capability has increased, there had been strong demand for an increase in recording capacity to achieve high-capacity recording and size reduction. Further, there has been further demands than in the past for reliability for the use and data storage under the wide environmental condition (in particular, under the condition in which a temperature and a humidity change intensely) due to broaden an environment in which magnetic recording tapes are employed, and for reliability for performance such as stable data-recording and readout in multiple running by repeated use at high speed.

In the past, the magnetic recording tapes employed in digital signal recording systems were determined by system, with magnetic recording tapes corresponding to model DLT; models 3480, 3490, and 3590; model QIC; model D8; and model DDS being known. Further, irrespective of the system, the magnetic recording tape employed comprises a magnetic layer comprising a ferromagnetic powder and a binder with a single-layer structure of comparatively high thickness of 2.0 to 3.0 $\mu$m on one side of a nonmagnetic support, with a backcoat layer preventing uneven winding and ensuring good running durability being provided on the opposite surface from the magnetic layer. However, magnetic layers of the comparatively thick single-layer structure as mentioned above normally has a drawback in the form of thickness loss causing noise reduction.

To achieve improvement in reproduction output reduction caused by thickness loss in such magnetic layers, it is known that making the magnetic layer thin is effective. For example, Japanese Unexamined Patent Publication (KOKAI) Heisei No. 5-182178 discloses a magnetic recording medium in which a lower nonmagnetic layer comprised of an inorganic powder dispersed in a binder is applied on a nonmagnetic support and an upper magnetic layer of a thickness equal to or less than 1.0 $\mu$m in which a ferromagnetic powder is dispersed in a binder is provided thereover while said nonmagnetic layer is still wet.

However, with the rapid development of high-capacity and high-density magnetic recording disks and magnetic recording tapes, it has become difficult to achieve satisfactory characteristics even if using techniques such as those set forth above. In particular, when increasing the linear recording density and recording at high frequency to achieve both high capacity and a high data transfer rate, it is difficult to achieve adequate recording and reproduction characteristics in conventional media.

Thus, the present invention was devised in light of the above-described problems. It is an object of the present invention to provide a method of magnetic recording and reproducing capable of permitting high density recording on magnetic recording media even under the condition of high data transfer rates and yielding adequate recording and reproduction characteristics when a magnetoresistive head (referred to as an "MR head" hereinafter) is used in reproduction. A further object of the present invention is to provide a magnetic recording medium characterized by being used in this magnetic recording and reproducing method.

The present inventors conducted extensive research into methods of obtaining magnetic recording media having good electromagnetic characteristics, and in particular, extremely good electromagnetic characteristics when a signal magnetically recorded at high frequency was reproduced with an MR head. As a result, they discovered a method capable of yielding good high-density characteristics, unprecedented in the art, by reproducing with an MR head a signal having a prescribed frequency and magnetically recorded on a magnetic recording medium satisfying prescribed conditions; the present invention was devised on this basis.

SUMMARY OF THE INVENTION

That is, the present invention relates to a magnetic recording and reproducing method for reproducing a signal magnetically recorded on a magnetic recording medium with a magnetoresistive (MR) head, wherein said magnetic recording medium comprises a substantially nonmagnetic lower layer and a magnetic layer comprising a hexagonal ferrite ferromagnetic powder and a binder in this order on at least one side of a nonmagnetic support, in which said hexagonal ferrite ferromagnetic powder has a mean plate diameter ranging from 15 to 40 nm and a mean plate thickness ranging from 4 to 15 nm, and said magnetic layer has a coercive force Hc ranging from 143.3 to 318.4 kA/m (1800 to 4000 Oe), and said signal magnetically recorded has a maximum recording frequency ranging from 10 to 80 MHz.

Further, preferred modes of the present invention are as follows;

(1) The magnetic recording and reproducing method in which the hexagonal ferrite ferromagnetic powder has a mean plate diameter of 20 to 35 nm and a mean plate thickness of 7 to 12 nm, and the magnetic layer has a coercive force Hc of 159.2 to 278.6 kA/m (2000 to 3500 Oe).
(2) The magnetic recording and reproducing method in which said magnetic recording medium is a tape-shaped magnetic recording medium and said hexagonal ferrite ferromagnetic powder has a squareness of 0.6 to 0.9.
(3) The magnetic recording and reproducing method in which said magnetic recording medium is a disk-shaped magnetic recording medium and said hexagonal ferrite ferromagnetic powder has a squareness of 0.45 to 0.65.

Further, the present invention relates to a magnetic recording medium comprising a substantially nonmagnetic lower layer and a magnetic layer comprising a hexagonal ferrite ferromagnetic powder and a binder in this order on at least one side of a nonmagnetic support, in which said hexagonal ferrite ferromagnetic powder has a mean plate diameter ranging from 15 to 40 nm and a mean plate thickness ranging from 4 to 15 nm, and said magnetic layer has a coercive force Hc raging from 143.3 to 318.4 kA/m (1800 to 4000 Oe), wherein the magnetic recording medium is employed in a magnetic recording and reproducing method in which a signal having a maximum recording frequency ranging from 10 to 80 MHz is magnetically recorded thereon, and the signal magnetically recorded is reproduced with a magnetoresistive (MR) head.

The magnetic recording and reproducing method and the magnetic recording medium employed for the method of the present invention will be explained more in detail below.

In the present invention, magnetic recording is conducted on a magnetic recording medium at a maximum recording frequency of 10 to 80 MHz. The signal magnetically recorded on the magnetic recording medium has a maximum recording frequency of 10 to 80 MHz, preferably 15 to 60 MHz, and more preferably 20 to 40 MHz. When the maximum recording frequency of the magnetically recorded signal falls within the range of 10 to 80 MHz, good high-density characteristics are achieved when the signal that has been magnetically recorded on the magnetic recording medium is reproduced with an MR head. That is, maintaining a maximum recording frequency of magnetic recording that is equal to or greater than 10 MHz permits high-speed data transfer. Further, maintaining a maximum recording frequency of magnetic recording that is equal to or less than 80 MHz suppresses the effects of the magnetic viscosity of hexagonal ferrite ferromagnetic powder, yielding good magnetic recording.

The speed of the magnetic recording medium relative to the MR head is generally equal to or greater than 3 m/s, preferably equal to or greater than 10 m/s. This relative speed is controlled by the disk rotation speed in magnetic recording disks and by the tape transfer speed or cylinder rotation speed in magnetic recording tapes.

Hexagonal ferrite ferromagnetic powder is employed as the magnetic material in the method of the present invention. Hexagonal ferrite affords extremely good coercive force Hc, and excellent in chemical stability, corrosion resistance, and abrasion resistance due to substantial hardness. Accordingly, a magnetic recording medium employing hexagonal ferrite ferromagnetic powder corresponds to the need to reduce magnetic spacing with high densification, and can be expected to achieve a thin film, a high C/N and good resolution.

The mean plate diameter of the hexagonal ferrite ferromagnetic powder employed in the present invention ranges from 15 to 40 nm, preferably from 20 to 35 nm, and more preferably from 20 to 30 nm. Further, the plate thickness of the hexagonal ferrite ferromagnetic powder ranges from 4 to 15 nm, preferably from 7 to 12 nm, and more preferably from 7 to 10 nm.

When the mean plate diameter of the hexagonal ferrite ferromagnetic powder is less than 15 nm, stable magnetization cannot be expected due to thermal fluctuation. By contrast, when the mean plate diameter is equal to or less than 40 nm, noise does not increase and the fill rate does not decrease, which are suited to high-density magnetic recording. Further, when the plate thickness of the hexagonal ferrite ferromagnetic powder is equal to or greater than 7 nm, adequate orientation properties can be achieved. When the plate thickness is equal to or less than 15 nm, noise does not increase due to stacking between particles. When the mean plate diameter and plate thickness of the hexagonal ferrite ferromagnetic powder fall within the above-stated ranges, it is possible to maintain magnetic anisotropy, thereby the coercive force Hc does not drop.

The coercive force (Hc) of the magnetic layer comprising the hexagonal ferrite ferromagnetic powder in the present invention ranges from 143.3 to 318.4 kA/m (1,800 to 4,000 Oe), preferably from 159.2 to 278.6 kA/m (2,000 to 3,500 Oe), and more preferably from 175.1 to 238.8 kA/m (2,200 to 3,000 Oe). When the coercive force Hc of the magnetic layer falls within the above-stated range, recording demagnetization does not occur and output does not drop. Further, recording with MR heads can be conducted smoothly and a decrease in output can be prevented.

In a tape-shaped magnetic recording medium, the squareness (SQ) desirably ranges from 0.6 to 0.9. A squareness equal to or greater than 0.6 is desirable because it permits high reproduction output. The upper limit of squareness (SQ) is not specifically limited, but a value equal to or less than 0.9 is desirable because it permits suppression of an increase in noise due to stacking of barium ferrite. Further, when conducting random orientation in a disk-shaped magnetic recording medium, squareness (SQ) desirably ranges from 0.45 to 0.65, with the squareness (SQ) being desirably isotropic within the disk. When circumferential orientation is conducted, the squareness (SQ) is desirably 0.6 to 0.9 in the circumferential direction as the magnetic tape recording medium.

In the method of the present invention, a signal magnetically recorded on a magnetic recording medium is reproduced with an MR head. The MR head employed in the method of the present invention is not specifically limited. For example, a GMR or TMR head may be employed. Further, although the head employed in magnetic recording is not specifically limited, a saturation magnetization level is desirably equal to or higher than 1.0 T, preferably equal to or higher than 1.5 T.

Next, the magnetic layer, the lower layer, the nonmagnetic support, the layer structure, the manufacturing method and physical characteristics of the magnetic recording medium employed in the present invention will be explained more in detail.

[Magnetic Layer]

<Hexagonal Ferrite Powder>

Examples of hexagonal ferrite ferromagnetic powders comprised in the magnetic layer of the present invention are various substitution products of barium ferrite, strontium ferrite, lead ferrite, and calcium ferrite, and Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods.

The particle size of the hexagonal ferrite is, as a mean particle diameter of hexagonal plate, 15 to 40 nm, preferably 20 to 35 nm. The mean plate diameter is 15 to 40 nm, preferably 20 to 35 nm, more preferably 20 to 30 nm, as mentioned above. The mean plate thickness is 4 to 15 nm, preferably 7 to 12 nm, more preferably 7 to 10 nm, as mentioned above. The plate ratio (plate diameter/plate thickness) is 1 to 10, preferably 2 to 5. If the plate ratio is 1 to 10, it is possible to achieve adequate orientation properties while maintaining a high filling property, as well as to prevent noise increase due to stacking between particles. In addition, the specific surface area by BET method within the above-mentioned particle size is 10 to 200 $m^2/g$, almost corresponding to an arithmetic value from the particle plate diameter and the plate thickness.

For the hexagonal ferrite particle, narrow distributions of particle plate diameter and plate thickness are normally preferred. Although difficult to render in number form, 500 particles can be randomly measured in a TEM photograph of particles to make a comparison. The distributions of the particle plate diameter and plate thickness are often not a normal distribution. However, when expressed as the standard deviation to the average size, σ/average size=0.1 to 2.0. The particle producing reaction system is rendered as uniform as possible and the particles produced are subjected to a distribution-enhancing treatment to achieve a sharp particle size distribution. For example, methods such as selectively dissolving ultrafine particles in an acid solution by dissolution are known.

The coercive force (Hc) of the hexagonal ferrite particle is 143.3 to 318.4 kA/m (1800 to 4000 Oe), preferably 159.2 to 278.6 kA/m (2000 to 3500 Oe), more preferably 175.1 to 238.8 kA/m (2200 to 3000 Oe). The coercive force (Hc) can be controlled by particle size (plate diameter and plate thickness), the types and quantities of elements contained, substitution sites of the element, the particle producing reaction conditions, and the like.

The saturation magnetization (σs) of the hexagonal ferrite particle is 40 to 80 emu/g. The higher saturation magnetization (σs) is preferred, however, it tends to decrease with decreasing particle size. Known methods of improving saturation magnetization (σs) are combining spinel ferrite with magnetoplumbite ferrite, selection of the type and quantity of elements incorporated, and the like. It is also possible to employ W-type hexagonal ferrite. When dispersing the magnetic material, the surface of the magnetic material particles is processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added ranges from 0.1 to 10 mass percent relative to the mass of the magnetic material. The pH of the magnetic material is also important to dispersion. A pH of about 4 to 12 is usually optimum for the dispersion medium and polymer. From the perspective of the chemical stability and storage properties of the medium, a pH of about 6 to 11 can be selected. Moisture contained in the magnetic material also affects dispersion. There is an optimum level for the dispersion medium and polymer, usually selected from the range of 0.01 to 2.0 percent.

Methods of manufacturing the hexagonal ferrite ferromagnetic powder include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. However, any manufacturing method can be selected in the present invention. The hexagonal ferrite ferromagnetic powder may be surface treated as necessary with Al, Si, P, an oxide thereof, or the like. The quantity employed desirably ranges from 0.1 to 10 percent of the ferromagnetic powder, and when a surface treatment is conducted, a lubricant such as a fatty acid is desirably adsorbed in a quantity of equal to or less than 100 $mg/m^2$. An inorganic ion in the form of soluble Na, Ca, Fe, Ni, Sr, or the like may be contained in the ferromagnetic powder. These are preferably substantially not contained, but at levels of equal to or less than 200 ppm, characteristics are seldom affected.

<Binder>

Conventionally known thermoplastic resins, thermosetting resins, reactive resins and mixtures thereof may be employed as binders employed in the magnetic layer of the present invention.

The thermoplastic resins have a glass transition temperature of −100 to 150° C., have a number average molecular weight of 1,000 to 200,000, preferably 10,000 to 100,000, and have a degree of polymerization of about 50 to 1,000. Examples of the thermoplastic resins are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins.

Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. The thermoplastic resins, the thermosetting resins and the reactive resins are described in detail in the *Handbook of Plastics* published by Asakura Shoten.

Further, when an electron-beam curing resin is employed in the individual layers, not only coating strength is enhanced and durability is improved, but also the surface becomes smoother, further enhancing electromagnetic characteristics. These examples and methods of manufacturing them are described in detail in Japanese Unexamined Patent Publication (KOKAI) Showa No. 62-256219. The above-described resins may be employed singly or in combination. The preferred resin is a combination of polyurethane resin and one or more selected from among vinyl chloride resin, vinyl chloride vinyl acetate copolymer, vinyl chloride vinyl acetate vinyl alcohol copolymer, and vinyl chloride vinyl acetate maleic anhydride copolymer; or a resin obtained by mixing polyisocyanate into one of the above.

Known polyurethane resins may be employed, such as polyester polyurethane, polyether polyurethane, polyether polyester polyurethane, polycarbonate polyurethane, polyester polycarbonate polyurethane, and polycaprolactone polyurethane. A binder obtained by incorporating as needed one or more polar groups selected from among —COOM, —$SO_3M$, —$OSO_3M$, —P=O$(OM)_2$, and —O—P=O$(OM)_2$ (where M denotes a hydrogen atom or an alkali metal base), —OH, —$NR_2$, —$N+R_3$ (where R denotes a hydrocarbon group), epoxy group, —SH, and —CN into any of the above-listed binders by copolymerization or addition reaction to improve dispersion properties and durability is desirably employed. The quantity of such a polar group ranges from $10^{-1}$ to $10^{-8}$ mol/g, preferably from $10^{-2}$ to $10^{-6}$ mol/g.

Specific examples of the binders are VAGH, VYHH, VMCH, VAGF, VAGD, VROH, VYES, VYNC, VMCC, XYHL, XYSG, PKHH, PKHJ, PKHC, and PKFE from Union Carbide Corporation; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated.; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The quantity of binder added to the magnetic layer in the present invention ranges from 5 to 50 mass percent, preferably from 10 to 30 mass percent, relative to the mass of the hexagonal ferrite ferromagnetic powder. When employing vinyl chloride resin, the quantity of binder added is preferably from 5 to 30 mass percent; when employing polyurethane resin, from 2 to 20 mass percent; and when employing polyisocyanate, from 2 to 20 mass percent. They may be employed in combination. However, for example, when head corrosion occurs due to the release of trace amounts of chlorine, polyurethane alone or just polyurethane and isocyanate may be employed. When polyurethane is employed in the present invention, the glass transition temperature ranges from −50 to 150° C., preferably from 0 to 100° C.; the elongation at break desirably ranges from 100 to 2,000 percent; the stress at break desirably ranges from 0.49 to 98 MPa (0.05 to 10 kg/mm$^2$); and the yield point desirably ranges from 0.49 to 98 MPa (0.05 to 10 kg/mm$^2$).

The magnetic recording medium employed in the present invention comprises at least two layers of the lower layer and the magnetic layer. Accordingly, the quantity of binder; the quantity of vinyl chloride resin, polyurethane resin, polyisocyanate, or some other resin in the binder; the molecular weight of each of the resins forming the magnetic layer; the quantity of polar groups; or the physical characteristics or the like of the above-described resins can naturally be different in the lower layer and each of the magnetic layers as required. These should be optimized in each layer. Known techniques for a multilayered magnetic layer may be applied. For example, when the quantity of binder is different in each layer, increasing the quantity of binder in the magnetic layer effectively decreases scratching on the surface of the magnetic layer. To achieve good head touch, the quantity of binder in the lower layer can be increased to impart flexibility.

Examples of polyisocyanates suitable for use in the present invention are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co. Ltd. They can be used singly or in combinations of two or more in each of layers by exploiting differences in curing reactivity.

Additives may be added to the magnetic layer of the present invention as needed. Examples of additives are carbon black, abrasives, lubricants, dispersion agents, dispersion assistants, anti-mold agents, antistatic agents, anti-oxidation agents, and solvents.

<Carbon Black>

Carbon black may be added to the magnetic layer of the present invention as needed.

Examples of types of carbon black that are suitable for use in the magnetic layer are: furnace black for rubber, thermal for rubber, black for coloring, and acetylene black. It is preferable that the specific surface area is 5 to 500 m$^2$/g, the DBP oil absorption capacity is 10 to 400 ml/l00g, the particle diameter is 5 to 300 m$\mu$, the pH is 2 to 10, the moisture content is 0.1 to 10 percent, and the tap density is 0.1 to 1 g/ml.

Specific examples of types of carbon black employed in the present invention are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Japan EC Co., Ltd. The carbon black employed may be surface-treated with a dispersant or grafted with resin, or have a partially graphite-treated surface. The carbon black may be dispersed in advance into the binder prior to addition to the magnetic coating material. These carbon blacks may be used singly or in combination. When employing carbon black, the quantity preferably ranges from 0.1 to 30 mass percent with respect to the mass of the magnetic material. In the magnetic layer, carbon black works to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the magnetic layer and the lower layer based on the objective and the various characteristics stated above, such as particle size, oil absorption capacity, electrical conductivity, and pH, and be optimized for each layer.

For example, the *Carbon Black Handbook* compiled by the Carbon Black Association may be consulted for types of carbon black suitable for use in the magnetic layer of the present invention.

<Abrasives>

Abrasives can be contained in the magnetic layer for improving the mechanical strength of the magnetic layer as well as for preventing clogging of the magnetic head. Known materials, chiefly with a Mohs' hardness equal to or higher than 6, such as α-alumina having an a -conversion rate equal to or higher than 90 percent, β-alumina, silicon carbide, chromium oxide, cerium oxide, α-iron oxide, corundum, artificial diamond, silicon nitride, titanium carbide, titanium oxide, silicon dioxide, and boron nitride, may be used singly or in combination as abrasives employed in the present invention. Further, a composite comprising two or more of these abrasives (an abrasive obtained by surface-treating one abrasive with another) may also be used. Although these abrasives may contain compounds and elements other than the main component or element in some cases, there is no change in effect so long as the main component constitutes equal to or higher than 90 percent. The particle size of these abrasives preferably ranges from 0.01 to 2 $\mu$m, a narrow particle size distribution being particularly desirable for improving electromagnetic characteristics. As needed to improve durability, abrasives of differing particle size may be combined or the same effect may be achieved by broadening the particle diameter distribution even with a single abrasive. A tap density of 0.3 to 2 g/mL, a moisture content of 0.1 to 5 percent, a pH of 2 to 11, and a specific surface area of 1 to 30 $m^2$/g are desirable. The abrasive employed in the present invention may be any of acicular, spherical, or cubic in shape, but shapes that are partially angular have good abrasion properties and are thus preferred.

Specific examples of abrasives are: AKP-12, AKP-15, AKP-20, AKP-30, AKP-50, HIT-20, HIT-30, HIT-55, HIT-60, HIT-70, HIT-80 and HIT-100 from Sumitomo Chemical Co., Ltd.; ERC-DBM, HP-DBM, and HPS-DBM from Reynolds Co.; WA10000 from Fujimi Abrasives Co.; UB20 from Kamimura Kogyo Co., Ltd.; G-5, Chromex U2, and Chromex U1 from Nippon Chemical Industrial Co., Ltd.; TF100 and TF-140 from Toda Kogyo Corp.; Beta Random Ultrafine from Ibidene Co.; and B-3 from Showa Mining Co., Ltd. As needed, these abrasives may be added to the lower layer. Addition to the lower layer permits control of surface shape and control of the manner in which the abrasive protrudes. It is, as a matter of course, preferred that the particle diameter and quantity of abrasive added to the magnetic layer and lower layer are optimally established.

<Other Additives>

Other additives can be added to the magnetic layer of the present invention. Examples are molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones, various silane coupling agents and titanium coupling agents; fluorine-containing alkyl sulfuric acid esters and their alkali metal salts; monobasic fatty acids (which may contain an unsaturated bond or be branched) having 10 to 24 carbon atoms and metal salts (such as Li, Na, K, and Cu) thereof; monohydric, dihydric, trihydric, tetrahydric, pentahydric or hexahydric alcohols with 12 to 22 carbon atoms (which may contain an unsaturated bond or be branched); monofatty esters, difatty esters, or trifatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); fatty acid esters of monoalkyl ethers of alkylene oxide polymers; alkoxy alcohols with 12 to 22 carbon atoms; fatty acid amides with 8 to 22 carbon atoms; and aliphatic amines with 8 to 22 carbon atoms.

Specific examples of these fatty acids are: capric acid, caprylic acid, lauric acid, myristic acid, palmitic acid, stearic acid, behenic acid, oleic acid, elaidic acid, linolic acid, linolenic acid, and isostearic acid. Examples of esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in A Guide to Surfactants (published by Sangyo Tosho K.K.). These lubricants, antistatic agents and the like need not be 100 percent pure and may contain impurities, such as isomers, unreacted material, by-products, decomposition products, and oxides in addition to the main components. These impurities preferably comprise equal to or less than 30 percent, and more preferably equal to or less than 10 percent.

The above-mentioned lubricants and surfactants employed in the present invention each have different physical effects. The type, quantity, and combination ratio of lubricants producing synergistic effects should be optimally set for a given objective. It is conceivable to control bleeding onto the surface through the use of fatty acids having different melting points in the lower layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant in the intermediate layer. The present invention is not limited to these examples. Generally, a total quantity of lubricant ranging from 0.1 to 50 mass percent, preferably from 2 to 25 mass percent with respect to the magnetic material or nonmagnetic powder is selected.

All or some of the additives used in the present invention may be added at any stage in the process of manufacturing the magnetic layer coating liquid and the lower layer coating liquid. For example, they may be mixed with the magnetic material before a kneading step; added during a step of kneading the magnetic material, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane.

These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition be not less than the arithmetic mean value of the lower layer solvent composition. To improve dispersion properties, a solvent having a somewhat strong polarity is desirable. It is desirable that solvents having a dielectric constant equal to or higher than 15 are comprised equal to or higher than 50 percent of the solvent composition. Further, the dissolution parameter is desirably 8 to 11.

[Lower Layer]

The detailed contents of the lower layer will be described below. The lower layer of the magnetic recording medium of the present invention is substantially nonmagnetic. However, the term "substantially nonmagnetic lower layer" employed in the present invention means that it may have a degree of magnetism to the extent that it does not contribute to recording, and is to be construed as being synonymous with "nonmagnetic layer."

The inorganic powder employed in the lower layer of the present invention is an inorganic compound, selected from inorganic compounds such as metal oxides, metal carbonates, metal sulfates, metal nitrides, metal carbides, metal sulfides and the like. Examples of inorganic compounds are $\alpha$-alumina having an $\alpha$-conversion rate equal to or higher than 90 percent, $\beta$-alumina, $\gamma$-alumina, $\theta$-alumina, silicon carbide, chromium oxide, cerium oxide, $\alpha$-iron oxide, hematite, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and $\alpha$-iron oxide.

The particle size of these nonmagnetic powders preferably ranges from 0.005 to 2 $\mu$m, but nonmagnetic powders of differing particle size may be combined as needed, or the particle diameter distribution of a single nonmagnetic powder may be broadened to achieve the same effect. What is preferred most is a particle size in the nonmagnetic powder ranging from 0.01 to 0.2 $\mu$m. Particularly when the nonmagnetic powder is a granular metal oxide, a mean particle diameter equal to or less than 0.08 $\mu$m is preferred, and when an acicular metal oxide, the major axis length is preferably equal to or less than 0.3 $\mu$m, more preferably equal to or less than 0.2 $\mu$m. The tap density ranges from 0.05 to 2 g/ml, preferably from 0.2 to 1.5 g/ml. The moisture content of the nonmagnetic powder ranges from 0.1 to 5 mass percent, preferably from 0.2 to 3 mass percent, further preferably from 0.3 to 1.5 mass percent. The pH of the nonmagnetic powder ranges from 2 to 11, and the pH between 5.5 to 10 is particular preferred. The specific surface area of the nonmagnetic powder ranges from 1 to 100 m$^2$/g, preferably from 5 to 80 m$^2$/g, further preferably from 10 to 70 m$^2$/g. The crystallite size of the nonmagnetic powder preferably ranges from 0.004 to 1 $\mu$m, further preferably from 0.04 to 0.1 $\mu$m. The oil absorption capacity using dibutyl phthalate (DBP) ranges from 5 to 100 ml/100 g, preferably from 10 to 80 ml/g, further preferably from 20 to 60 ml/100 g. The specific gravity of the nonmagnetic powder ranges from 1 to 12, preferably from 3 to 6. The shape of the nonmagnetic powder may be any of acicular, spherical, polyhedral, or plate-shaped. The Mohs' hardness is preferably 4 to 10. The stearic acid (SA) adsorption capacity of the nonmagnetic powders ranges from 1 to 20 $\mu$mol/m$^2$, preferably from 2 to 15 $\mu$mol/m$^2$, further preferably from 3 to 8 $\mu$mol/m$^2$. The pH between 3 to 6 is preferred. The surface of these nonmagnetic powders is preferably treated with Al$_2$O$_3$, SiO$_2$, TiO$_2$, ZrO$_2$, SnO$_2$, Sb$_2$O$_3$, ZnO and Y$_2$O$_3$. The surface-treating agents of preference with regard to dispersibility are Al$_2$O$_3$, SiO$_2$, TiO$_2$, and ZrO$_2$, and Al$_2$O$_3$, SiO$_2$ and ZrO$_2$ are further preferable. These may be used singly or in combination. Depending on the objective, a surface-treatment coating layer with a coprecipitated material may also be employed, the coating structure which comprises a first alumina coating and a second silica coating thereover or the reverse structure thereof may also be adopted. Depending on the objective, the surface-treatment coating layer may be a porous layer, with homogeneity and density being generally desirable.

Specific examples of nonmagnetic powders suitable for use in the lower layer of the present invention are: Nanotite from Showa Denko K. K.; HIT-100 and ZA-GI from Sumitomo Chemical Co., Ltd.; α-hematite DPN-250, DPN-250BX, DPN-245, DPN-270BX, DPN-500BX, DBN-SA1 and DBN-SA3 from Toda Kogyo Corp.; titanium oxide TTO-51B, TTO-55A, TTO-55B, TTO-55C, TTO-55S, TTO-55D, SN-100, a-hematite E270, E271, E300 and E303 from Ishihara Sangyo Co., Ltd.; titanium oxide STT-4D, STT-30D, STT-30, STT-65C, and α-hematite α-40 from Titan Kogyo K. K.; MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; and sintered products of the same. Particular preferable nonmagnetic powders are titanium dioxide and α-iron oxide.

Carbon black can be added additionally to the lower layer of the present invention. Mixing carbon black achieves the known effects of lowering surface resistivity Rs and reducing light transmittance, as well as yielding the desired micro Vickers hardness. Further, the incorporation of carbon black into the lower layer can also serve to store lubricants. Examples of types of carbon black that are suitable for use are furnace black for rubber, thermal for rubber, black for coloring and acetylene black. Based on the effect desired, the following characteristics should be optimized in the carbon black in the lower layer, and effects may be achieved by using different carbon blacks in combination.

The specific surface area of carbon black employed in the lower layer ranges from 100 to 500 m$^2$/g, preferably from 150 to 400 m$^2$/g and the DBP oil absorption capacity ranges from 20 to 400 ml/lOOg, preferably from 30 to 400 ml/100 g. The particle diameter of carbon black ranges from 5 to 80 m μ, preferably from 10 to 50 m μ, further preferably from 10 to 40 mμ. It is preferable for carbon black that the pH ranges from 2 to 10, the moisture content ranges from 0.1 to 10 percent and the tap density ranges from 0.1 to 1 g/ml.

Specific examples of types of carbon black suitable for use in the present invention are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B, MA-600, MA-230, #4000 and #4010 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 mass percent with respect to the inorganic powder above and does not exceed 40 percent with respect to the total mass of the nonmagnetic layer. These types of carbon black may be employed singly or in combination. The *Carbon Black Handbook* compiled by the Carbon Black Association may be consulted for types of carbon black suitable for use in the present invention.

Based on the objective, an organic powder may be added to the lower layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed.

Binder resins, lubricants, dispersing agents, additives, solvents, dispersion methods, and the like suited to the magnetic layer may be adopted to the lower layer. In particular, known techniques for the quantity and type of binder resin and the quantity and type of additives and dispersant employed in the magnetic layer may be adopted thereto.

[Backcoat Layer]

Generally, a magnetic tape for computer data recording is required to have better repeat running properties than a video tape or audio tape. To maintain such high running durability, carbon black and inorganic powders are desirably incorporated into the backcoat layer.

<Carbon Black>

Two types of carbon black having different average particle sizes are desirably employed in combination. In this case, a microgranular carbon black having an average particle size of 10 to 20 nm (mμ) and a coarse granular carbon black having an average particle size of 230 to 300 nm (mμ) are desirably combined for use. Generally, the addition of a microgranular carbon black such as that set forth above permits low surface electrical resistivity in the backcoat layer and low optical transmittance. Since many magnetic recording devices employ tape optical transmittance as an actuating signal, in such cases, the addition of microgranular carbon black is particularly effective. Further, the microgranular carbon black generally has a storage ability of liquid lubricants. When employed with a lubricant in combination, it contributes to a reduction in the coefficient of friction. On the other hand, the coarse granular carbon black with a particle size of 230 to 300 nm (mμ) functions as a solid lubricant, forming micro protrusions on the surface of the back layer that reduce the contact surface area and contribute to a reduction in the coefficient of friction. However, in systems subjected to harsh running, the coarse granular carbon black tends to drop out from the backcoat layer due to tape sliding and has the drawback of being related to an increase in the error rate.

Specific products of microgranular carbon black are given below; RAVEN200B (18 nm (mμ), RAVEN1500B (17 nm (mμ) (the above products are manufactured by Columbia Carbon Co., Ltd.), BP800 (17 nm (mμ) (manufactured by Cabot Corporation), PRINTEX90 (14 nm (mμ), PRINTEX95 (15 nm (mμ)), PRINTEX85 (16 nm (mμ)), PRINTEX75 (17 nm (mμ) (the above products are manufactured by Degusa Co.), and #3950 (16 nm (mμ)) (manufactured by Mitsubishi chemical industry Co., Ltd.).

Specific products of coarse granular carbon black are given below; Thermal Black (270 nm (mμ)) (manufactured by Cancarb Limited.), RAVEN MTP (275 nm (mμ)) (manufactured by Columbia Carbon Co., Ltd.).

When employing two types of carbon black with differing average particle sizes in the backcoat layer, the content ratio (by mass) of microgranular carbon black of 10 to 20 nm (mμ) to coarse granular carbon black of 230 to 300 nm (mμ) is desirably from 98:2 to 75:25, more preferably from 95:5 to 85:15.

The content of carbon black (the sum of both when two types of carbon black are employed) in the backcoat layer is normally from 30 to 80 mass parts, preferably from 45 to 65 mass parts, per 100 mass parts of binder.

<Inorganic Powder>

Two types of inorganic powder of differing hardness are desirably employed in combination. Specifically, a soft inorganic powder with a Mohs' hardness of 3 to 4.5 and a hard inorganic powder with a Mohs' hardness of 5 to 9 are desirably employed.

The addition of a soft inorganic powder with a Mohs' hardness of 3 to 4.5 permits stabilization of the coefficient of friction due to repeat running. Further, with a hardness falling within this range, the sliding guide poles are not shaved. The average particle size of the inorganic powder desirably ranges from 30 to 50 nm (m$\mu$). Examples of soft inorganic powders having a Mohs' hardness of 3 to 4.5 are: calcium sulfate, calcium carbonate, calcium silicate, barium sulfate, magnesium carbonate, zinc carbonate, and zinc oxide. These may be employed singly or in combinations of two or more. Of these, calcium carbonate is particularly preferred.

The content of soft inorganic powder in the backcoat layer preferably ranges from 10 to 140 mass parts, more preferably from 35 to 100 mass parts, per 100 mass parts of carbon black.

The addition of a hard inorganic powder with a Mohs' hardness of 5 to 9 strengthens the backcoat layer and improves running durability. The use of these inorganic powders with carbon black and the above-described soft inorganic powder decreases deterioration due to repeat sliding, yielding a strong backcoat layer. The addition of this inorganic powder imparts a suitable extent of grinding ability, reducing the adhesion of shavings to the tape guide poles or the like. In particular, when combined with a soft inorganic powder (preferably calcium carbonate), the sliding properties against the guide poles with their coarse surfaces is improved, permitting a backcoat layer with a stable coefficient of friction. The hard inorganic powder desirably has an average particle size of 80 to 250 nm (m$\mu$), more preferably 100 to 210 nm (m$\mu$).

Examples of hard inorganic powders having a Mohs' hardness of 5 to 9 are: $\alpha$-iron oxide, $\alpha$-alumina, and chromium oxide ($Cr_2O_3$). These powders may be employed singly or in combination. Of these, $\alpha$-iron oxide and $\alpha$-alumina are preferred. The content of hard inorganic powder normally ranges from 3 to 30 mass parts, preferably from 3 to 20 mass parts, per 100 mass parts of carbon black.

When employing the soft inorganic powder and the hard inorganic powder together in the backcoaat layer, the soft inorganic powder and the hard inorganic powder are desirably selected for use so that the difference in hardness between the soft inorganic powder and hard inorganic powder is equal to or greater than 2 (preferably equal to or greater than 2.5, more preferably equal to or greater than 3).

The above-described two types of inorganic powders of differing Mohs' hardnesses of specified average particle size and the above-described two types of carbon black of differing average particle size are desirably incorporated in the backcoat layer. In this combination, the incorporation of calcium carbonate as the soft inorganic powder is particularly preferred.

It is possible to incorporate lubricants into the backcoat layer. The lubricants may be suitably selected from among the examples of lubricants given for use in the above-described lower layer and magnetic layer. The lubricants are normally added to the backcoat layer within a range of 1 to 5 mass parts per 100 mass parts of binder.

[Nonmagnetic Support]

The nonmagnetic support employed in the present invention can be known films such as polyesters such as polyethylene terephthalate and polyethylene naphthalate, polyolefins, cellulose triacetate, polycarbonates, polyamides, polyimides, polyamidoimides, polysulfones, polyaramides, aromatic polyamides, and polybenzooxazoles. Of these, the use of high-strength supports such as polyethylene naphthalate and polyamide is preferred. To change the surface roughness of the magnetic surface and base surface, a laminated support such as those described in Japanese Unexamined Patent Publication (KOKAI) Heisei No. 3-224127 may be employed as required. These nonmagnetic supports may be subjected beforehand to corona discharge treatment, plasma treatment, adhesion-enhancing treatment, heat treatment, dust removal, or the like. Aluminum and glass substrates may be employed as the nonmagnetic support in the present invention.

To achieve the objects of the present invention, the center surface average surface roughness SRa of the nonmagnetic support as measured by the Mirau method with a TOPO-3D made by WYKO is equal to or less than 8.0 nm, preferably equal to or less than 4.0 nm, and more preferably equal to or less than 2.0 nm. Not only does such a support desirably have a low center surface average surface roughness, but there are also desirably no large protrusions equal to or higher than 0.5 $\mu$m. The surface roughness shape may be freely controlled through the size and quantity of filler added to the support as needed. Examples of such fillers are oxides and carbonates of elements such as Ca, Si, and Ti, and organic micropowders such as acrylic-based one. The support desirably has a maximum height SRmax equal to or less than 1 $\mu$m, a ten-point average roughness $SR_z$ equal to or less than 0.5 $\mu$m, a center surface peak height $SR_P$ equal to or less than 0.5 $\mu$m, a center surface valley depth $SR_V$ equal to or less than 0.5 $\mu$m, a center-surface surface area SSr equal to or higher than 10 percent and equal to or less than 90 percent, and an average wavelength S $\lambda_a$ of 5 to 300 $\mu$m. To achieve desired electromagnetic characteristics and durability, the surface protrusion distribution of the support can be freely controlled with fillers. It is possible to control within a range from 0 to 2,000 protrusions of 0.01 to 1 $\mu$m in size per 0.1 $mm^2$.

The F-5 value of the nonmagnetic support employed in the present invention desirably ranges from 49 to 490 MPa (5 to 50 $kg/mm^2$). The thermal shrinkage rate of the support after 30 min at 100° C. is preferably equal to or less than 3 percent, more preferably equal to or less than 1.5 percent. The thermal shrinkage rate after 30 min at 80° C. is preferably equal to or less than 0.5 percent, more preferably equal to or less than 0.1 percent. The breaking strength ranges from 49 to 980 MPa (5 to 100 $kg/mm^2$). The modulus of elasticity preferably ranges from 0.98 to 19.6 GPa (100 to 2,000 $kg/mm^2$). The thermal expansion coefficient ranges from $10^{-4}$ to $10^{-8}$/° C., preferably from $10^{-5}$ to $10^{-6}$/° C. The moisture expansion coefficient is equal to or less than $10^{-4}$/RH percent, preferably equal to or less than $10^{-5}$/RH percent. These thermal characteristics, dimensional characteristics, and mechanical strength characteristics are desirably nearly equal, with a difference equal to less than 10 percent, in all in-plane directions.

[Layer Structure]

With respect to the thickness structure of the magnetic recording medium employed in the present invention, the thickness of the nonmagnetic support ranges from 2 to 100 $\mu$m, preferably from 2 to 80 $\mu$m. For computer tapes, the nonmagnetic support having a thickness of 3.0 to 6.5 $\mu$m (preferably 3.0 to 6.0 $\mu$m, more preferably 4.0 to 5.5 $\mu$m) is employed.

An undercoating layer for improving adhesion between the nonmagnetic support and the lower layer or magnetic layer may be provided in the magnetic recording medium employed in the present invention. The thickness of the undercoating layer ranges from 0.01 to 0.5 μm, preferably from 0.02 to 0.5 μm. The magnetic recording medium employed in the present invention may be a disk-shaped medium with double-sided magnetic layers in which a nonmagnetic layer and magnetic layer are provided on both sides of the nonmagnetic support, or may have these layers on just one side. In that case, a backcoat layer may be provided to prevent static and correct for curling on the opposite side from the side on which the lower layer and magnetic layer are provided. The thickness of this layer ranges from 0.1 to 4 μm, preferably from 0.3 to 2.0 μm. Known undercoating layers and backcoat layers may be employed.

The thickness of the magnetic layer is selected from thin layers of 0.01 to 0.3 μm so as to conform to the performance required by the high-density magnetic recording method or magnetic head, preferably ranging from 0.03 to 0.2 μm, more preferably 0.05 to 0.15 μm. The rate of variation in thickness of the magnetic layer is desirably within ±20 percent, more preferably within ±5 percent. It is also possible to separate the magnetic layer into two or more layers having different magnetic characteristics, and to suitably employ configurations relating to known multilayer magnetic layers.

The thickness of the lower layer ranges from 0.2 to 5.0 μm, preferably 0.3 to 3.0 μm, and more preferably 1.0 to 2.5 μm.

The lower layer of the present invention is effective so long as it is substantially nonmagnetic. For example, it exhibits the effect of the present invention even when it comprises impurities or trace amounts of magnetic material that have been intentionally incorporated, and can be viewed as substantially having the same configuration as the present invention.

Specifically, the term "substantially nonmagnetic" is used to mean having a residual magnetic flux density in the lower layer of equal to or less than 50 T·m (500 G), or a coercive force Hc of equal to or less than 39.8 kA/m (500 Oe), it being preferable not to have a residual magnetic flux density or coercive force at all.

[Manufacturing Method]

The process for manufacturing the coating material for magnetic layer of the magnetic recording medium employed in the present invention comprises at least a kneading step, a dispersing step, and a mixing step to be carried out, if necessary, before and/or after the kneading and dispersing steps. Each of the individual steps may be divided into two or more stages. All of the starting materials employed in the present invention, including the hexagonal ferrite ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. When a kneader is employed, the magnetic material or nonmagnetic powder and all or part of the binder (preferably equal to or higher than 30 percent of the entire quantity of binder) are kneaded in a range of 15 to 500 mass parts per 100 mass parts of magnetic material. Details of the kneading process are described in Japanese Unexamined Patent Publication (KOKAI) Heisei Nos. 1-106338 and 1-79274. Further, glass beads may be employed to disperse the coating liquid for magnetic layer and the coating liquid for lower layer, with a dispersing medium with a high specific gravity such as zirconia beads, titania beads, and steel beads being suitable for use. The particle diameter and fill ratio of these dispersing media are optimized for use. A known dispersing device may be employed.

Methods such as the following are desirably employed when coating a multilayer-structured magnetic recording medium in the present invention;

(1) A method in which the lower layer is first applied with a coating device commonly employed to apply magnetic coating materials such as a gravure coating, roll coating, blade coating, or extrusion coating device, and the magnetic layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672;

(2) A method in which the upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672; and (3) A method in which the magnetic and lower layers are applied nearly simultaneously using an extrusion coating apparatus with a backup roller as disclosed in Japanese Unexamined Patent Publication (KOKAI) Heisei No. 2-174965.

To avoid compromising the electromagnetic characteristics or the like of the magnetic recording medium by aggregation of magnetic particles, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No. 3-8471. Applying the lower layer, drying it, and then applying the magnetic layer thereover in a sequential multilayer coating to achieve the structure of the present invention is also possible, and does not compromise the effect of the present invention. However, to reduce the number of voids in the coating and improve the quality as regards dropout and the like, the above-describe simultaneous multilayer coating is preferred.

In disk-shaped magnetic recording media, it is sometimes possible to achieve adequately isotropic orientation without conducting orientation with an orienting device. However, the use of a known random orientation device in which cobalt magnets are reciprocally positioned at an angle and an alternating current is applied with a solenoid is preferred. Generally, isotropic orientation preferably refers to, in the case of ferromagnetic micropowder, in-plane two-dimensional randomness, but a vertical component can also be imparted and three-dimensional randomness achieved. In the case of hexagonal ferrite, it is generally easy to achieve in-plane and vertical three-dimensional randomness, but in-plane two-dimensional randomness is also possible.

Further, known methods such as two-pole opposed magnets can be employed to impart vertical orientation, thereby imparting isotropic magnetic characteristics in a circumferential direction. In particular, during high-density recording, vertical orientation is desirable. Further, circumferential orientation may also be imparted by spin coating.

In tape-shaped magnetic recording media, cobalt magnets and solenoids are employed to impart orientation in the longitudinal direction. The temperature and flow volume of the drying air, and coating rate are desirably controlled to control the drying position of the coating. The coating rate preferably ranges from 20 to 1,000 m/min, and the temperature of the drying air is preferably equal to or higher than 60° C. It is also possible to conduct suitable predrying prior to entering the magnet zone.

Processing may be conducted with calender rolls in the form of heat-resistant plastic rolls such as epoxy, polyimide, polyamide, and polyimidoamide, or metal rolls. When forming two-surface magnetic layers, treatment with metal rolls is particularly desirable. The processing temperature is preferably equal to or higher than 50° C., more preferably equal to or higher than 100° C. The linear pressure is desirably equal to or higher than 200 kg/cm, more preferably equal to or higher than 300 kg/cm.

[Physical Properties]

The saturation magnetic flux density of the magnetic layer of the magnetic recording medium employed in the present invention ranges from 100 to 300 T·m (1,000 to 3,000 G). The coercive force (Hc) of the magnetic layer ranges from 143.3 to 318.4 kA/m (1,800 to 4,000 Oe), preferably from 159.2 to 278.6 kA/m (2,000 to 3,500 Oe). A narrow coercive force distribution is desirable, with the SFD and SFDr being equal to or less than 0.6, preferably equal to or less than 0.2.

It is preferable that the coefficient of friction of the magnetic recording medium employed in the present invention relative to the head is equal to or less than 0.5 and preferably equal to or less than 0.3 at temperatures ranging from −100 to 40° C. and humidity ranging from 0 percent to 95 percent, the specific surface resistivity desirably ranges from $10^4$ to $10^{12}$ Ω/sq on the magnetic surface, and the charge potential preferably ranges from −500 V to +500 V. The modulus of elasticity at 0.5 percent extension of the magnetic layer desirably ranges from 0.98 to 19.6 GPa (100 to 2,000 kg/mm$^2$) in each in-plane direction. The breaking strength desirably ranges from 98 to 686 MPa (10 to 70 kg/mm$^2$). The modulus of elasticity of the magnetic recording medium desirably ranges from 0.98 to 14.7 GPa (100 to 1,500 kg/mm$^2$) in each in-plane direction. The residual elongation is desirably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature of the magnetic layer (i.e., the temperature at which the loss elastic modulus of dynamic viscoelasticity peaks as measured at 110 Hz) of the magnetic layer is preferably 50 to 120° C., and that of the lower layer preferably ranges from 0 to 100° C. The loss elastic modulus preferably falls within a range of $1 \times 10^7$ to $8 \times 10^8$ Pa ($1 \times 10^8$ to $8 \times 10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by 10 percent or less, in each in-plane direction of the medium.

The residual solvent in the magnetic layer is preferably equal to or less than 100 mg/m$^2$ and more preferably equal to or less than 10 mg/m$^2$. The void ratio in the coated layers, including both the nonmagnetic lower layer and the magnetic layer, is preferably equal to or less than 30 volume percent, more preferably equal to or less than 20 volume percent. Although a low void ratio is preferable for attaining high output, there are some cases in which it is better to ensure a certain level based on the object. For example, in many cases, larger void ratio permits preferred running durability in disk media in which repeat use is important.

The center surface average surface roughness Ra of the magnetic layer as measured by Mirau method with a TOPO-3D is preferably equal to or less than 4.0 nm, more preferably equal to or less than 3.0 nm, and still more preferably equal to or less than 2.0 nm. Preferably, the maximum height of the magnetic layer, $SR_{max}$, is equal to or less than 0.5 μm; the ten-point average roughness $SR_z$ is equal to or less than 0.3 μm; the center surface peak height $SR_p$ is equal to or less than 0.3 μm, the center surface valley depth $SR_v$ is equal to or less than 0.3 μm, the center surface area percentage $SS_r$ ranges from 20 to 80 percent, and the average wavelength S λ a ranges from 5 to 300 μm. The number of surface protrusions in the magnetic layer measuring from 0.01 μm to 1 μm in size is preferably set to within a range of 0 to 2,000, thereby electromagnetic characteristics and the coefficient of friction are preferably optimized. These can be easily controlled by varying surface properties with fillers in the support, as well as by the particle diameter and quantity of powders added to the magnetic layer, the surface shape of the rollers employed in calendaring and the like. Curling is preferably within ±3 mm.

It will be readily deduced that the physical properties of the lower layer and magnetic layer may be varied based on the objective in the magnetic recording medium of the present invention. For example, the modulus of elasticity of the magnetic layer may be increased to improve running durability while simultaneously employing a lower modulus of elasticity than that of the magnetic layer in the lower layer to improve the head contact of the magnetic recording medium.

Embodiments

The present invention is described more specifically below through embodiments. The fact that the components, ratios, operations, sequences, and the like given therein may be varied without departing from the scope of the present invention will be readily understood by persons skilled in the art. Accordingly, the present invention should not be limited by the embodiments described below. Further, the "parts" given in the embodiments are mass parts unless specifically stated otherwise.

(Embodiments 1–17 and Comparative Examples 1–9)

Coating material for magnetic layer

| | |
|---|---|
| Barium ferrite magnetic powder | 100 parts |
| Molar ratio composition to Ba:Fe 9.10, Co 0.20, Zn 0.77 | |
| Coercive force Hc: 183 kA/m (2300 Oe) | |
| Specific surface area: 55 m$^2$/g | |
| Saturation magnetization σ s: 58 A · m$^2$/kg (58 emu/g) | |
| Plate diameter: 25 nm | |
| Plate thickness: 8 nm | |
| Vinyl chloride copolymer | 10 parts |
| MR110 (manufactured by Nippon Zeon Co., Ltd.) | |
| Polyurethane resin | 4 parts |
| UR8200 (manufactured by Toyobo Co., Ltd.) | |
| α-alumina | 8 parts |
| HIT55 (Manufactured by Sumitomo Chemical Co., Ltd.) | |

-continued (Embodiments 1–17 and Comparative Examples 1–9)

| | |
|---|---|
| Carbon black | 1 part |
| #50 (manufactured by Asahi Carbon Co., Ltd.) | |
| Phenylphosphorous acid | 1 part |
| Butyl stearate | 10 parts |
| Butoxyethyl stearate | 5 parts |
| Isohexadecyl stearate | 3 parts |
| Stearic acid | 2 parts |
| Methyl ethyl ketone | 125 parts |
| Cyclohexanone | 125 parts |
| Coating material for lower layer | |
| Nonmagnetic powder α-$Fe_2O_3$ hematite | 80 parts |
| Major axis length: 0.08 μm | |
| Specific surface area by BET method: 60 $m^2$/g | |
| pH: 9 | |
| Surface treatment agent: $Al_2O_3$, 8 mass percent | |
| Carbon black | 15 parts |
| Conductex SC-U (manufactured by Columbia Carbon Co., Ltd.) | |
| Vinyl chloride copolymer | 14 parts |
| MR110 (vinyl chloride copolymer) | |
| Polyurethane resin | 4 parts |
| UR8200 (manufactured by Toyobo Co., Ltd.) | |
| Phenylphosphorous acid | 3 parts |
| Butyl stearate | 8 parts |
| Butoxyethyl stearate | 5 parts |
| Isohexadecyl stearate | 2 parts |
| Stearic acid | 3 parts |
| Methyl ethyl ketone/cyclohexanone (solvent mixed at 8/2) | 250 parts |

Manufacturing Method 1 (Disk: W/D)

Each component for each of above-listed coating materials was kneaded in a kneader and dispersed in a sand mill. Polyisocyanate was added to the dispersions obtained: 10 parts to the lower layer coating liquid, and 10 parts to the magnetic layer coating liquid, and 40 parts of cyclohexanone were added to each. The coating liquids were then filtered with a filter having an average pore size of 1 μm to obtain lower layer and magnetic layer-forming coating liquids respectively.

The lower layer coating liquid was applied to a polyethylene terephthalate support having a center surface average surface roughness of 1.8 nm and a thickness of 62 μm in a quantity calculated to yield a thickness after drying of 1.5 μm, dried, and calendered. Subsequently, a magnetic layer was applied thereover by blade method in a quantity designed to yield a magnetic layer of 0.8 μm. The product was passed through two devices generating intense alternating current magnetic fields of a frequency of 50 Hz and a magnetic field intensity of 25 T·m (250 G) and a frequency of 50 Hz and 12 T·m (120 G) as a random orientation treatment. Following drying, processing was conducted with a seven-stage calender at a temperature of 90° C. and a linear pressure of 300 kg/cm; the product was punched to 3.7 inches; and surface polishing was conducted.

When barium ferrite magnetic material is employed, vertical orientation is also possible in addition to the above orientation method. Further, as needed, after punching out the disks, after-processing may be conducted. For example, thermal processing at high temperature (normally 50 to 90° C.) can be conducted to promote setting of the coating layers, and with polished tape, a burnishing treatment can be conducted to shave away protrusions from the surface. It is also possible not to calender the nonmagnetic layer.

Manufacturing Method 2 (Disk: Spincoat)

Each component of the lower layer and the magnetic layer coating materials was kneaded in a kneader and dispersed using a sand mill. Polyisocyanate was added to the dispersions obtained: 10 parts to the lower layer coating liquid and 10 parts to the magnetic layer coating liquid. To each were then added 40 parts of cyclohexanone and the mixtures were filtered with a filter having an average pore size of 1 μm to prepare coating liquids for forming the lower layer and magnetic layer.

The lower layer coating liquid obtained was applied by spin coating on a polyethylene naphthalate support having a center surface average surface roughness of 1.8 nm and a thickness of 62 μm in a quantity calculated to yield a thickness after drying of 1.5 μm. After drying once, the magnetic layer was then coated thereover by spin coating in a quantity designed to yield a magnetic layer thickness of 0.08 μm and subjected to orientation processing in the circumferential direction with 600 T·m (6,000 G) Co magnets with same poles arranged opposite. The surface was then smoothened by batch-type extension processing at the same pressure as in Manufacturing method 1. Subsequent processing was conducted in the same manner as in Manufacturing method 1. It is also possible to apply the lower layer by spin coating and then, while the nonmagnetic layer is still wet, apply the magnetic layer thereover by spin coating. The use of spin coating affords the advantages of not only increasing the level of residual magnetization in the recording direction, but also reducing the vertical magnetization component of the barium ferrite to achieve symmetrical reproduction waveforms.

Flexible disk was prepared from the above-described magnetic layer coating material and lower layer coating material by Manufacturing Method 1; this was referred to as Sample A1 (Embodiment 1). Samples prepared in the same manner as A1 with the exception that the plate thickness and plate diameter of the barium ferrite magnetic material were varied were referred to as A2 (Embodiment 2), A3 (Embodiment 3), A4 (Embodiment 4), A5 (Embodiment 5), Bi (Comparative Example 1), B2 (Comparative Example 2), and B3 (Comparative Example 3). Magnetic characteristics (coercive force Hc and squareness SQ) were then measured at Hm796 kA/m (10 kOe) with a vibrating sample magnetometer (made by Toei Kogyo K.K.). Samples obtained by the same manner as in A1 with the exception that the coercive force (Hc) of the barium ferrite magnetic material was changed to 119.4 kA/m (1,500 Oe), 143. 2 kA/m (1,800 Oe), 160.8 kA/m (2,020 Oe), 242.8 kA (3,050 Oe), 278.6 kA/m (3,500 Oe), 302.5 kA/m (3,800 Oe), and 358.2 kA/m (4,500 Oe) were referred to as B4 (Comparative Example 4), A6 (Embodiment 6), A7 (Embodiment 7), A8 (Embodiment 8), A9 (Embodiment 9), A10 (Embodiment 10), and B5 (Comparative Example 5). A sample obtained by the same method as in A1 (Embodiment 1) with the exception that Manufacturing Method 2 was employed was referred to as A11 (Embodiment 11). Further, a sample obtained by employing a magnetic field in the opposed magnets in A11 of 800 T·m (8,000 G) was referred to as A12 (Embodiment 12).

Each of above-described samples was placed on a spin stand equipped with a head and the rotational speed of the medium relative to the head was adjusted to 4 m/s at the radial position where measurement was conducted.

Next, a 10 MHz square wave signal was recorded on the disks with an inductive head and reproduced with an AMR head, and the signal output was measured. Noise ranging from 0 to 20 MHz was then integrated and the ratio thereof was taken as the SN. Next, in Sample A1, the square wave signal frequency was made 5 MHz (Comparative Example 6), 20 MHz (Embodiment 13), 50 MHz (Embodiment 14), and 80 MHz (Embodiment 15); the rotational speed was changed to achieve a square wave signal interval equal to 10

MHz; and remaining steps identical to those set forth above were employed to measure the SN. For Sample B1, a square wave signal frequency of 5 MHz was employed, the rotational speed was changed to achieve a square wave signal interval equal to 10 MHz, and remaining steps identical to those set forth above were employed to measure the SN (Comparative Example 7). Reproduction heads in the form of the inductive head used for recording (Comparative Example 8), a GMR head (Embodiment 16), and a TMR head (Embodiment 17) were employed for Sample A1, a reproduction head in the form of the inductive head used for recording (Comparative Example 9) was employed for Sample B1, and remaining steps identical to those set forth above were employed to measure the SN of 10 MHz square wave signals. The results are given in Table 1.

| (Embodiments 18–34 and Comparative Examples 10–18) | |
|---|---|
| Coating material for backcoat layer | |
| Microgranular carbon black powder (BP-800 manufactured by Cabot Corporation, mean particle size: 17 nm (mμ)) | 100 parts |
| Coarse granular carbon black powder (Thermal Black manufactured by Cancarb Limited., mean particle size: 270 nm (mμ)) | 10 parts |
| Calcium carbonate (soft inorganic powder) (Hakuenka O manufactured by Shiraishi Kogyo Co., Ltd, mean particle size: 40 nm (mμ), Mohs' hardness: 3) | 80 parts |
| α-alumina (hard inorganic powder) (mean particle size: 200 nm (mμ), Mohs' hardness: 9) | 5 parts |
| Nitrocellulose resin | 140 parts |
| Polyurethane resin | 15 parts |
| Polyisocyanate | 40 parts |
| Polyester resin | 5 parts |
| Dispersion agent: | |
| Copper oleate | 5 parts |
| Copper phthalocyanine | 5 parts |
| Barium sulfate | 5 parts |
| Methyl ethyl ketone | 2200 parts |
| Butyl acetate | 300 parts |
| Toluene | 600 parts |

Each component used to form the above-described backcoat layer was kneaded in a kneader and dispersed in a sand mill. The dispersion obtained was passed through a filter having an average pore size of 1 μm to prepare a backcoat layer coating liquid.

Manufacturing Method 3 (Computer Tape: W/W)

Each component of the same coating material as in Embodiments 1 to 17 was kneaded in a kneader and dispersed in a sand mill. Polyisocyanate was added to the dispersions obtained: 2.5 parts to the lower layer coating liquid and 3 parts to the magnetic layer coating liquid, after which 40 parts of cyclohexanone were added to each. The coating materials were then passed through a filter having an average pore size of 1 μm to prepare lower layer and magnetic layer coating liquids.

The lower layer coating liquid obtained was applied in a quantity designed to yield a thickness after drying of 1.7 μm, and immediately thereafter, the magnetic layer coating liquid was applied thereover in a quantity designed to yield a thickness of 0.08 μm, on an aramide support (product name: Mictron) 4.4 μm in thickness and having a center surface average surface roughness of 2 nm. While both layers were still wet, orientation was conducted with a cobalt magnet having a magnetic force of 400 T·m (4,000 G) and a solenoid having a magnetic force of 400 T·m (4,000 G). Following drying, the product was processed with a seven-stage calender configured with only metal rolls at a temperature of 85° C. and a speed of 200 m/min. Subsequently, a backcoat layer was applied in a quantity yielding a dry thickness of 0.5 μm.

The product was slitted to a width of 3.8 mm and the surface of the magnetic layer was cleaned with a tape cleaning device by mounting it on a device equipped with slitted product feeding and winding devices so that a nonwoven fabric and razor blade contacted with a magnetic surface.

A tape-shaped magnetic recording medium was prepared by Manufacturing Method 3 using the magnetic layer coating material and lower layer coating material of Embodiment 1. This was referred to as Sample A13 (Embodiment 18). Samples obtained in the same manner as in A13 with the exception that the plate thickness and plate diameter of the barium ferrite magnetic material was varied were referred to as Sample A14 (Embodiment 19), A15 (Embodiment 20), A16 (Embodiment 21), A17 (Embodiment 22), B6 (Comparative Example 10), B7 (Comparative Example 11), and B8 (Comparative Example 12). Magnetic characteristics (magnetic layer coercive force Hc and squareness SQ) were then measured at Hm796 kA/m (10 kOe) with a vibrating sample magnetometer (made by Toei Kogyo K.K.). Samples obtained by the same manner as in A13 with the exception that the coercive force (Hc) of the barium ferrite magnetic material was changed to 119.4 kA/m (1,500 Oe), 143. 3 kA/m (1,800 Oe), 160.8 kA/m (2,020 Oe), 242.8 kA (3,050 Oe), 278.6 kA/m (3,500 Oe), 302.5 kA/m (3,800 Oe), and 358.2 kA/m (4,500 Oe) were referred to as B9 (Comparative Example 13), A18 (Embodiment 23), A19 (Embodiment 24), A20 (Embodiment 25), A21 (Embodiment 26), A22 (Embodiment 27), and B10 (Comparative Example 14).

A sample obtained by the same method as in A13 with the exception that it was oriented with a cobalt magnet having a magnetic force of 600 T·m (6,000 G) and a solenoid having a magnetic force of 600 T·m (6,000 G) was referred to as A23 (Embodiment 28), and a sample obtained by the same method as in A13 with the exception that it was oriented with a cobalt magnet having a magnetic force of 800 T·m (8,000 G) and a solenoid having a magnetic force of 800 T·m (8,000 G) was referred to as A24 (Embodiment 29).

Further, a sample obtained in the same manner as A13 with the exception of being oriented with a cobalt magnet having a magnetic force of 400 T·m (4,000 G) was referred to as A25 (Embodiment 30) and a sample obtained in the same manner as A13 with the exception of being oriented with a solenoid having a magnetic force of 400 T·m (4,000 G) was referred to as A26 (Embodiment 31).

Each disk sample was placed on a drum tester equipped with a head and the rotational speed was adjusted so the speed of the head relative to the medium was 4 m/s. An inductive head was then used to record 10 MHz square wave signals on the disks, the output of the signal obtained by reproducing with a rotating AMR head was measured, the noise in the 0 to 20 MHz range was integrated, and the ratio was referred to as SN.

For Sample A13, the maximum recording frequency of the square wave signal was made 5 MHz (Comparative Example 15), 20 MHz (Comparative Example 32), 50 MHz (Embodiment 33), and 80 MHz (Embodiment 34), the rotational speed was varied to achieve a square wave signal interval equal to 10 MHz, and remaining steps identical to those set forth above were conducted to measure the SN. For Sample B6, the maximum recording frequency of the square wave signal was made 5 MHz (Comparative Example 16), the rotational speed was varied to achieve a square wave signal interval equal to 10 MHz, and remaining steps identical to those set forth above were conducted to measure the SN. The SN for 10 MHz square wave signals of Samples A13 and B6 was measured in the same manner using a reproduction head in the form of the inductive head used for recording (Comparative Example 17 and 18). The results are given in Table 2.

TABLE 1

| Embodiments and comparative examples | Sample No. | Barium ferrite ferromagnetic material | | Magnetic layer | | Re-production head | Maximum recording frequency (MHz) | S/N (dB) |
|---|---|---|---|---|---|---|---|---|
| | | Plate diameter (nm) | Plate thickness (nm) | Hc KA/m (Oe) | SQ | | | |
| Embodiment 1 | A1 | 25 | 8 | 183.1 (2300) | 0.50 | AMR head | 10 | 27.8 |
| Embodiment 2 | A2 | 30 | 10 | 183.1 (2300) | 0.51 | AMR head | 10 | 26.5 |
| Embodiment 3 | A3 | 40 | 15 | 186.3 (2340) | 0.50 | AMR head | 10 | 24.2 |
| Comp. Ex. 1 | B1 | 50 | 10 | 186.3 (2340) | 0.50 | AMR head | 10 | 18.5 |
| Comp. Ex. 2 | B2 | 40 | 17 | 184.7 (2320) | 0.52 | AMR head | 10 | 19.3 |
| Embodiment 4 | A4 | 20 | 7 | 182.3 (2290) | 0.45 | AMR head | 10 | 27.2 |
| Embodiment 5 | A5 | 15 | 4 | 181.5 (2280) | 0.43 | AMR head | 10 | 23.8 |
| Comp. Ex. 3 | B3 | 10 | 3 | 175.9 (2210) | 0.42 | AMR head | 10 | 14.2 |
| Comp. Ex. 4 | B4 | 25 | 8 | 119.4 (1500) | 0.50 | AMR head | 10 | 18.3 |
| Embodiment 6 | A6 | 25 | 8 | 143.2 (1800) | 0.51 | AMR head | 10 | 22.5 |
| Embodiment 7 | A7 | 25 | 8 | 160.8 (2020) | 0.50 | AMR head | 10 | 25.4 |
| Embodiment 8 | A8 | 25 | 8 | 242.8 (3050) | 0.51 | AMR head | 10 | 27.0 |
| Embodiment 9 | A9 | 25 | 8 | 278.6 (3500) | 0.50 | AMR head | 10 | 26.1 |
| Embodiment 10 | A10 | 25 | 8 | 302.5 (3800) | 0.50 | AMR head | 10 | 23.9 |
| Comp. Ex 5 | B5 | 25 | 8 | 358.2 (4500) | 0.50 | AMR head | 10 | 17.2 |
| Embodiment 11 | A11 | 25 | 8 | 201.4 (2530) | 0.90 | AMR head | 10 | 30.3 |
| Embodiment 12 | A12 | 25 | 8 | 204.6 (2570) | 0.94 | AMR head | 10 | 23.2 |
| Comp. Ex. 6 | A1 | 25 | 8 | 183.1 (2300) | 0.50 | AMR head | 5 | 20.5 |
| Embodiment 13 | A1 | 25 | 8 | 183.1 (2300) | 0.50 | AMR head | 20 | 26.8 |
| Embodiment 14 | A1 | 25 | 8 | 183.1 (2300) | 0.50 | AMR head | 50 | 24.5 |
| Embodiment 15 | A1 | 25 | 8 | 183.1 (2300) | 0.50 | AMR head | 80 | 22.8 |
| Comp. Ex. 7 | B1 | 50 | 10 | 186.3 (2340) | 0.50 | AMR head | 5 | 21.2 |
| Comp. Ex. 8 | A1 | 25 | 8 | 183.1 (2300) | 0.50 | Inductive head | 10 | 17.2 |
| Comp. Ex. 9 | B1 | 50 | 10 | 186.3 (2340) | 0.50 | Inductive head | 10 | 16.7 |
| Embodiment 16 | A1 | 25 | 8 | 183.1 (2300) | 0.50 | GMR head | 10 | 31.5 |
| Embodiment 17 | A1 | 25 | 8 | 199.0 (2500) | 0.50 | TMR head | 10 | 33.0 |

TABLE 2

| Embodiments and comparative examples | Sample No. | Barium ferrite ferromagnetic material | | Magnetic layer | | Re-production head | Maximum recording frequency (MHz) | S/N (dB) |
|---|---|---|---|---|---|---|---|---|
| | | Plate diameter (nm) | Plate thickness (nm) | Hc KA/m (Oe) | SQ | | | |
| Embodiment 18 | A13 | 25 | 8 | 199.0 (2500) | 0.82 | AMR head | 10 | 29.8 |
| Embodiment | A14 | 30 | 10 | 199.0 | 0.83 | AMR head | 10 | 27.7 |

TABLE 2-continued

| Embodiments and comparative examples | Sample No. | Barium ferrite ferromagnetic material Plate diameter (nm) | Plate thickness (nm) | Magnetic layer Hc KA/m (Oe) | SQ | Reproduction head | Maximum recording frequency (MHz) | S/N (dB) |
|---|---|---|---|---|---|---|---|---|
| Embodiment 19 | | | | (2500) | | | | |
| Embodiment 20 | A15 | 40 | 15 | 202.2 (2540) | 0.90 | AMR head | 10 | 26.2 |
| Comp. Ex. 10 | B6 | 50 | 10 | 202.2 (2540) | 0.91 | AMR head | 10 | 19.8 |
| Comp. Ex. 11 | B7 | 40 | 17 | 200.6 (2520) | 0.87 | AMR head | 10 | 20.2 |
| Embodiment 21 | A16 | 20 | 7 | 198.2 (2490) | 0.80 | AMR head | 10 | 29.2 |
| Embodiment 22 | A17 | 15 | 4 | 197.4 (2480) | 0.78 | AMR head | 10 | 25.7 |
| Comp. Ex. 12 | B8 | 10 | 3 | 194.3 (2410) | 0.65 | AMR head | 10 | 16.8 |
| Comp. Ex. 13 | B9 | 25 | 8 | 127.4 (1600) | 0.82 | AMR head | 10 | 19.9 |
| Embodiment 23 | A18 | 25 | 8 | 150.4 (1890) | 0.83 | AMR head | 10 | 24.5 |
| Embodiment 24 | A19 | 25 | 8 | 167.1 (2100) | 0.81 | AMR head | 10 | 27.9 |
| Embodiment 25 | A20 | 25 | 8 | 250.7 (3150) | 0.82 | AMR head | 10 | 29.5 |
| Embodiment 26 | A21 | 25 | 8 | 286.6 (3600) | 0.79 | AMR head | 10 | 28.1 |
| Embodiment 27 | A22 | 25 | 8 | 318.4 (4000) | 0.79 | AMR head | 10 | 26.0 |
| Comp. Ex. 14 | B10 | 25 | 8 | 365.4 (4590) | 0.76 | AMR head | 10 | 19.0 |
| Embodiment 28 | A23 | 25 | 8 | 201.4 (2530) | 0.90 | AMR head | 10 | 26.3 |
| Embodiment 29 | A24 | 25 | 8 | 204.6 (2570) | 0.94 | AMR head | 10 | 25.0 |
| Embodiment 30 | A25 | 25 | 8 | 191.0 (2400) | 0.60 | AMR head | 10 | 26.8 |
| Embodiment 31 | A26 | 25 | 8 | 187.9 (2360) | 0.55 | AMR head | 10 | 24.6 |
| Comp. Ex. 15 | A13 | 25 | 8 | 199.0 (2500) | 0.82 | AMR head | 5 | 22.5 |
| Embodiment 32 | A13 | 25 | 8 | 199.0 (2500) | 0.82 | AMR head | 20 | 28.8 |
| Embodiment 33 | A13 | 25 | 8 | 199.0 (2500) | 0.82 | AMR head | 50 | 26.8 |
| Embodiment 34 | A13 | 25 | 8 | 199.0 (2500) | 0.82 | AMR head | 80 | 24.7 |
| Comp. Ex. 16 | B6 | 50 | 10 | 202.2 (2540) | 0.92 | AMR head | 5 | 23.5 |
| Comp Ex. 17 | A13 | 25 | 8 | 199.0 (2500) | 0.82 | inductive head | 10 | 19.0 |
| Comp. Ex. 18 | B6 | 50 | 10 | 202.2 (2540) | 0.92 | Inductive head | 10 | 18.5 |

A comparison of disk-shaped recording media Embodiments 1 through 5 (Samples A1 through A5) with Comparative Examples 1 through 3 (Samples B1 through B3) based on Table 1 revealed that barium ferrite ferromagnetic materials having an average plate diameter and plate thickness falling within the ranges of the present invention exhibited particularly good SN ratios. A comparison of Embodiment 1 and Embodiments 6 through 10 (Samples A1 and A6 through A10) with Comparative Examples 4 and 5 (Samples B4 and B5) revealed that magnetic layers having levels of coercive force Hc falling within the range of the present invention exhibited particularly good SN ratios. Further, a comparison of Comparative Example 6 with Embodiments 1 and 13 to 15 revealed that when the linear recording density of the signal was held constant in the magnetic layer and the recording frequency was varied, particularly good SN ratios were exhibited for maximum frequencies ranging from 10 MHz to 80 MHz. A comparison of the relation between the average plate diameter and plate thickness of the barium ferrite employed in two samples (A1 and B1) to the maximum recording frequency of the magnetic layer (Embodiment 1, Comparative Examples 1, 6, and 7) revealed that the most excellent SN ratio was exhibited by Embodiment 1, in which all of the average plate diameter and plate thickness of barium ferrite and the maximum recording frequency of the magnetic layer were within the ranges of the present invention. Further, with regard to differences in reproduction heads, the use of MR heads (AMR heads, GMR heads, and TMR heads) was found to yield better SN ratios than the use of inductive heads based on Embodiments 1, 16, and 17, and Comparative Example 8.

The same results as in Embodiments 1 through 17 and Comparative Examples 1 through 9 could be achieved in computer tapes having backcoat layers (Embodiments 18 through 34 and Comparative Examples 10 through 18) (see Table 2).

As described above, the magnetic recording and reproduction method of the present invention is capable of high density recording on magnetic recording media even at high data transfer rates, and adequate recording and reproduction characteristics can be achieved when recording is conducted with MR heads. Further, the magnetic recording medium of the present invention can provide the most suitable magnetic recording medium for use in the magnetic recording and reproduction method of the present invention.

The present disclosure relates to the subject matter contained in Japanese Patent Application No. 2001-249288 filed on Aug. 20, 2001, which is expressly incorporated herein by reference in its entirety.

What is claimed is:

1. A magnetic recording and reproducing method for reproducing a signal magnetically recorded on a magnetic recording medium with a magnetoresistive (MR) head, wherein said magnetic recording medium comprises a substantially nonmagnetic lower layer and a magnetic layer comprising a hexagonal ferrite ferromagnetic powder and a binder in this order on at least one side of a nonmagnetic support, in which said hexagonal ferrite ferromagnetic powder has a mean plate diameter ranging from 15 to 40 nm and a mean plate thickness ranging from 4 to 15 nm, and said magnetic layer has a coercive force Hc ranging from 143.3 to 318.4 kA/m, and said signal magnetically recorded has a maximum recording frequency ranging from 40 50 to 80 MHz.

2. The magnetic recording and reproducing method according to claim 1, wherein said hexagonal ferrite ferromagnetic powder has a mean plate diameter ranging from 20 to 35 nm and a mean plate thickness ranging from 7 to 12 nm.

3. The magnetic recording and reproducing method according to claim 1, wherein said magnetic layer has a coercive force Hc ranging from 159.2 to 278.6 kA/m.

4. The magnetic recording and reproducing method according to claim 1, wherein said magnetic recording medium is a tape-shaped magnetic recording medium and said magnetic layer comprising a hexagonal ferrite ferromagnetic powder has a squareness ranging from 0.6 to 0.9.

5. The magnetic recording and reproducing method according to claim 1, wherein said magnetic recording medium is a disk-shaped magnetic recording medium and said magnetic layer comprising a hexagonal ferrite ferromagnetic powder has a squareness ranging from 0.45 to 0.65.

6. The magnetic recording and reproducing method according to claim 1, wherein said signal magnetically recorded has a maximum recording frequency ranging from 50 to 60 MHz.

* * * * *